United States Patent [19]

Okazaki

[11] Patent Number: 5,413,405
[45] Date of Patent: May 9, 1995

[54] ANTISKID BRAKE SYSTEM FOR VEHICLE

[75] Inventor: Haruki Okazaki, Hiroshima, Japan

[73] Assignee: Mazda Motor Corporation, Hiroshima, Japan

[21] Appl. No.: 226,082

[22] Filed: Apr. 11, 1994

[30] Foreign Application Priority Data

Apr. 12, 1993 [JP] Japan .................. 5-110103

[51] Int. Cl.[6] .......................... B60T 8/32; B60T 8/58
[52] U.S. Cl. .................. 303/103; 188/181 C; 303/102; 303/109
[58] Field of Search ............... 303/102, 103, 104, 105, 303/106, 109, 108, 111, 91, 96, 97, 98, 100; 188/181 C, 181 A; 364/426.01, 426.02, 426.03; 180/197

[56] References Cited

U.S. PATENT DOCUMENTS 5,171,070 12/1992 Okazaki et al. .................. 303/103

FOREIGN PATENT DOCUMENTS 4201772 7/1992 Japan .

Primary Examiner—Douglas C. Butler
Attorney, Agent, or Firm—Sixbey, Friedman, Leedom & Ferguson; Gerald J. Ferguson, Jr.; Donald R. Studebaker

[57] ABSTRACT

In an antiskid brake system for a vehicle, a wheel speed sensor detects the wheel speed of a wheel of the vehicle, a valve unit controls the braking pressure applied to the wheel and an electronic control unit effects an antiskid control in which it causes the valve unit to periodically increase and reduce the braking pressure applied to the wheel on the basis of the wheel speed of the wheel. The electronic control unit compares the wheel speed detected by the wheel speed sensor with a reference value, determines that the antiskid control has terminated when the former is lower than the latter, detects the condition of the road surface the vehicle is running and makes lower the reference value as the condition of the road surface is more apt to cause the wheel to skid.

6 Claims, 7 Drawing Sheets

ANTISKID BRAKE SYSTEM FOR VEHICLE

BACKGROUND OF THE INVENTION

1. Field of the Invention

This invention relates to an antiskid brake system for a vehicle which suppresses braking force so that an excessive braking force is not applied to the wheels of the vehicle during braking, and more particularly to such an antiskid brake system in which the braking pressure is periodically increased and reduced on the basis of wheel speeds detected by wheel speed sensors.

2. Description of the Prior Art

Recently many cars are provided with an antiskid brake system for preventing wheel lockup to prevent skid of the wheels during braking. The antiskid brake system generally comprises a solenoid control valve provided in the brake lines to control the braking pressure, wheel speed sensors for detecting the rotational speeds of the respective wheels, and a control unit which controls the solenoid control valve to suppress the braking force when it detects wheel lockup on the basis of the wheel speeds detected by the wheel speed sensors. That is, the control unit calculates the acceleration or deceleration of each of the wheels on the basis of the wheel speed detected by the wheel speed sensor and calculates the slip ratio of the wheel from the wheel speed and a pseudo vehicle speed estimated on the basis of the wheel speeds, and controls the solenoid control valve to reduce the braking pressure when the deceleration of the wheel speed falls below a predetermined value or the slip ratio reaches a predetermined value and to increase the braking pressure when the rotational speed increases due to reduction of the braking pressure and the acceleration of the wheel speed reaches a predetermined value. Such a series of braking pressure control (will be referred to as the antiskid control, hereinbelow) is repeated, for instance, until the vehicle stops. By such an antiskid brake system, lockup or skid of the wheels during sharp braking can be prevented and the vehicle can be stopped in a short distance without depriving directional stability.

In the antiskid brake system of this type, the wheel speed sensor measures the rotational speed of the wheel by detecting the rotational angle of the wheel per unit time and accordingly, the detecting accuracy tends to deteriorate as the wheel speed lowers. Therefore, at a low vehicle speed, especially at a very low vehicle speed just before the vehicle stopping, the vehicle speed cannot be precisely estimated and at the worst, the brake system operates as a normal brake system (a brake system having no antiskid control function).

In the antiskid brake system disclosed in Japanese Unexamined Patent Publication No. 4(1992)-201772, the antiskid control is terminated when the wheel speed detected by the wheel speed sensor falls below a reference value, and the barking pressure is increased at a rate which is reduced as the friction coefficient of the road surface estimated on the basis of the wheel speed reduces. With this arrangement, deterioration of controllability at a low vehicle speed, where the detecting accuracy of the wheel speed sensor is low, can be avoided and at the same time, on a road surface having a low friction coefficient such as a frozen road surface (will be referred to as "low $\mu$ road surface", hereinbelow), the vehicle can be stably stopped without wheel lockup since the braking pressure is gradually increased while on a road surface having a high friction coefficient such as a dry pavement surface, the vehicle can be surely stopped.

However the antiskid brake system has the following drawbacks due to the fact that the antiskid control is terminated when the wheel speed detected by the wheel speed sensor falls below a reference value.

That is, for example, assuming that the brake pedal is pushed down while the vehicle running a road surface having a high friction coefficient such as a dry pavement, the antiskid control is continued until just before the vehicle stopping though the road condition is not such that gives rise to skid of the wheels and the braking pressure can be unexpectedly reduced, for instance, just before the vehicle stops, which results in a stopping distance longer than that expected by the driver. This is due to the fact that the antiskid control is not terminated until the wheel speed falls below the reference value.

However if the reference value is set high, lockup or skid of the wheels cannot be effectively prevented on a low $\mu$ road surface.

SUMMARY OF THE INVENTION

In view of the foregoing observations and description, the primary object of the present invention is to provide an antiskid brake system of such a type that the braking pressure is periodically reduced and increased on the basis of the wheel speed during braking in which a desired barking feeling corresponding to the road surface condition can be obtained.

In accordance with the present invention, the antiskid brake system is provided with an antiskid control termination determining means which compares the wheel speed detected by a wheel speed sensor with a reference value and determines that the antiskid control has been terminated when the former is lower than the latter, a road surface condition detecting means which detects the condition of the road surface the vehicle is running and a reference value changing means which makes lower the reference value as the condition of the road surface detected by the road surface condition detecting means is more apt to cause the wheel to skid.

That is, in accordance with the present invention, since the reference value is lowered as the condition of the road surface is more apt to cause the wheel to skid, the reference value can be normally set large, the stopping distance comes to better conform to that expected by the driver on a high $\mu$ road surface where the gripping force of the wheels is large and at the same time, skid or lockup of the wheels can be surely prevented on a low $\mu$ road surface.

In one embodiment of the present invention, the road surface condition detecting means detects the friction coefficient of the road surface on the basis of the wheel speed, and the reference value changing means makes lower the reference value as the friction coefficient of the road surface becomes smaller.

In another embodiment of the present invention, the road surface condition detecting means estimates the pseudo vehicle speed on the basis of the wheel speed and calculates the rate of change of the pseudo vehicle speed per unit time, and said reference value changing means makes lower the reference value as the rate of change of the pseudo vehicle speed per unit time becomes smaller.

In accordance with these embodiments, since the road surface condition detecting means detects the condition of the road surface on the basis of the wheel speed, an additional sensor for detecting the condition of the road surface is not required.

DESCRIPTION OF THE PREFERRED EMBODIMENTS

Figure 1:
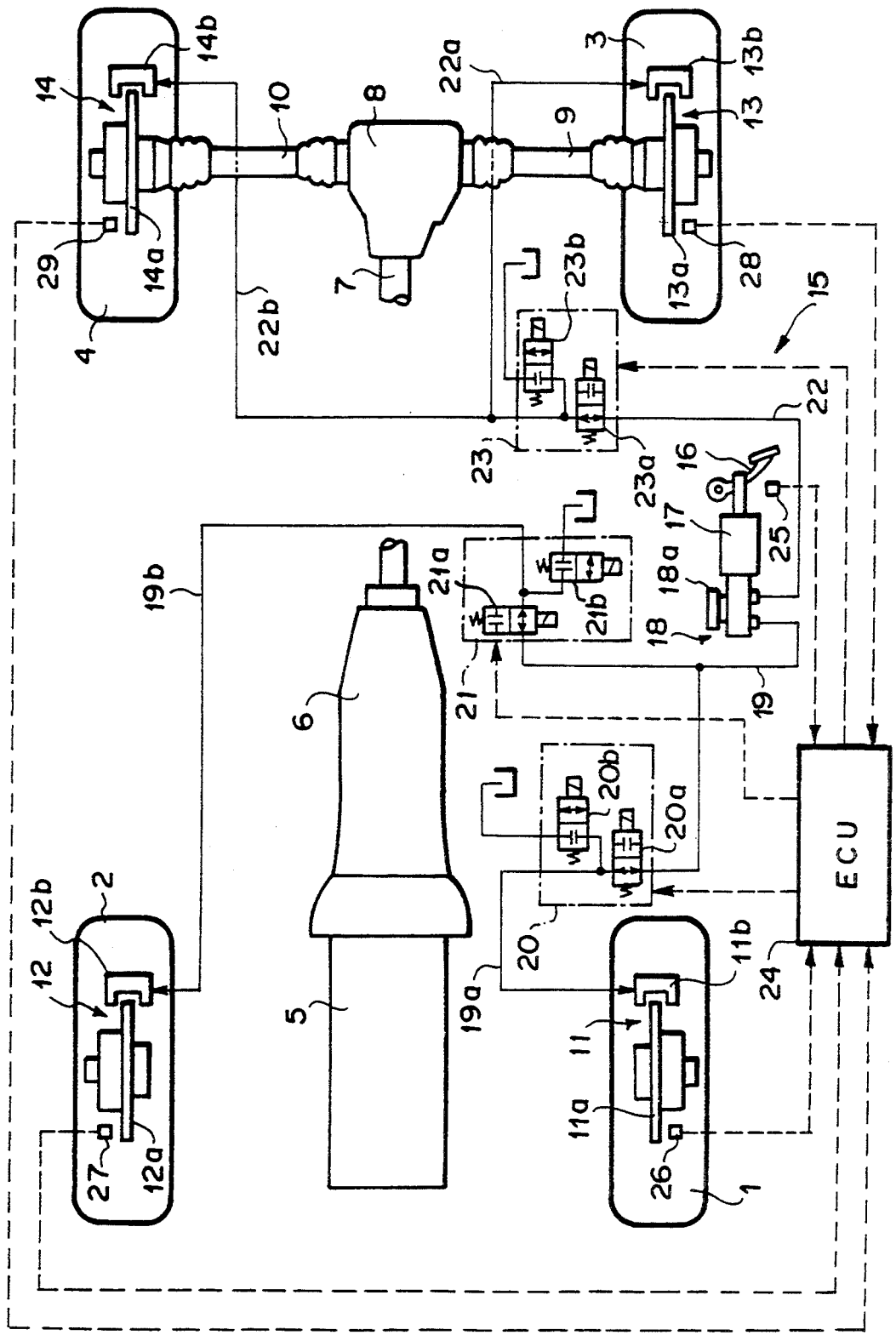
FIG. 1 is a schematic view showing a vehicle provided with an antiskid brake system.

In FIG. 1, a vehicle is provided with left and right front wheels 1 and 2, and left and right rear wheels 3 and 4. The vehicle is further provided with an engine 5 and the output torque of the engine 5 is transmitted to the rear wheels 3 and 4 through an automatic transmission 6, a propeller shaft 7, a differential 8 and left and right drive axles 9 and 10. That is, in this vehicle, the rear wheels 3 and 4 are driving wheels and the front wheels 1 and 2 are driven wheels.

The wheels 1 to 4 are respectively provided with brakes 11 to 14 comprising disks 11a to 14a which are rotated integrally with the wheels and calipers 11b to 14b which brake rotation of the disks 11a to 14a.

The brakes 11 to 14 are controlled by a brake control system 15 comprising a brake pedal 16, a booster 17, and a master cylinder 18 which generates a braking pressure corresponding to the brake pedal pushing force multiplied by the booster 17. A front brake line 19 from the master cylinder 18 branches into left and right branch lines 19a and 19b which are respectively connected to the calipers 11b and 12b of the left and right front brakes 11 and 12. The left branch line 19a for the left front brake 11 is provided with a first valve unit 20 comprising a solenoid on-off valve 20a and a solenoid relief valve 20b. The right branch line 19b for the right front brake 12 is provided with a second valve unit 21 comprising a solenoid on-off valve 21a and a solenoid relief valve 21b.

A rear brake line 22 from the master cylinder 18 is provided with a third valve unit 23 comprising a solenoid on-off valve 23a and a solenoid relief valve 23b. Further the rear brake line 22 branches into left and right branch lines 22a and 22b downstream of the third valve unit 23 which are respectively connected to the calipers 13b and 14b of the left and right rear brakes 13 and 14.

That is, the brake control system 15 has a first channel for controlling the braking pressure of the left front brake 11 by way of the first valve unit 20, a second channel for controlling the braking pressure of the right front brake 12 by way of the second valve unit 21 and a third channel for controlling the braking pressure of the left and right rear brakes 13 and 14 by way of the third valve unit 23. The first to third channels are controlled independently from each other.

Further the brake control system 15 is provided with an electronic control unit (ECU) 24 for controlling the first to third channels. A brake signal from a brake switch which detects on/off of the brake pedal 6 and wheel speed signals from first to fourth wheel speed sensors 26 to 29 which respectively detects the rotational speeds of the left and right front wheels 1 and 2 and the left and right rear wheels 3 and 4 are input into the electronic control unit 24. The electronic control unit 24 outputs braking pressure control signals based on the brake signal and the wheel speed signals to the first to third valve units 20, 21 and 23 to control the braking pressures to the left front wheel 1, the right front wheel 2 and the rear wheels 3 and 4 independently from and in parallel to each other.

That is, the electronic control unit 24 controls opening and closure of the on-off valves 20a, 21a and 23a and the relief valves 20b, 21n and 23b of the first to third valve units 20, 21 and 23 by duty control on the basis of the wheels speed signals from the respective wheel speed sensors 26 to 29, thereby applying the braking forces to the left front wheel 1, the right front wheel 2 and the rear wheels 3 and 4 with braking pressures corresponding to the slips of the respective wheels. The brake fluid discharged from the relief valves 20b, 21b and 23b is returned to the reservoir 18a of the master cylinder 18 through a drain line (not shown).

When the antiskid control is not effected, the electronic control unit 24 outputs no braking pressure control signal and the relief valves 20b, 21b and 23b are kept closed with the on-off valves 20a, 21a and 23a kept opened, whereby braking pressures generated by the master cylinder 18 according to the brake pedal pushing force are applied to the brakes 11 to 14 and braking forces corresponding to the braking pressures are directly applied to the wheels 1 to 4.

The brake control by the electronic control unit 24 will be briefly described hereinbelow.

The electronic control unit 24 calculates the acceleration or deceleration of the rotational speed of each wheel on the basis of the wheel speed represented by the signal from the corresponding wheel speed sensor. That is, the electronic control unit 24 divides the difference between the present value and the preceding value of the wheel speed by a predetermined sampling time $\Delta t$ (e.g., 7 ms) and converts the quotient to a value of the gravitational acceleration as the present acceleration or deceleration.

The electronic control unit 24 selects the lower of the wheel speeds W3 and W4 of the rear wheels as the rear wheel speed Wr taking into account the detecting error of the wheel speed sensors 28 and 29 during skid and the acceleration or deceleration obtained on the basis of the rear wheel speed Wr thus determined is used as the rear wheel acceleration or rear wheel deceleration.

Then the electronic control unit 24 estimates the pseudo vehicle speed Vr and the friction coefficient of the road surface in the following manner.

The electronic control unit 24 first determines the maximum Wmx of the wheel speeds W1 to W4 (wheel speeds of the wheels 1 to 4, respectively) and uses the maximum wheel speed Wmx as the pseudo vehicle speed Vr. However when the maximum wheel speed Wmx is one of the wheel speeds of the rear wheels 3 and 4 (the driving wheels), the higher of the wheel speeds W1 and W2 of the front wheels 1 and 2 is used as the pseudo vehicle speed Vr.

When all the wheels 1 to 4 are locked up, the electronic control unit 24 assumes the rate of change per unit time ΔVr of the pseudo vehicle speed Vr (will be referred to as "the rate of change ΔVr of the vehicle speed", hereinbelow) at the time with reference to the following table 1 where the rate of change ΔVr of the vehicle speed is set in relation to a value MU (will be referred to as "the friction value MU", hereinbelow) representing the friction coefficient of the road surface, and reduces the pseudo vehicle speed Vr on the basis of the rate of change ΔVr of the vehicle speed.

TABLE 1

| MU | 1 | 2 | 3 |
| --- | --- | --- | --- |
| ΔVr | −0.3 G | −0.8 G | −1.2 G |

That the friction value MU is 1 means that the friction coefficient $\mu$ of the road surface is low, that the friction value MU is 2 means that the friction coefficient $\mu$ of the road surface is middle, and that the friction value MU is 3 means that the friction coefficient $\mu$ of the road surface is high. According to table 1, the rate of change ΔVr of the vehicle speed is set smaller as the friction coefficient $\mu$ of the road surface becomes lower.

The pseudo vehicle speed Vr is estimated in this manner on the basis of the wheel speeds W1 to W4 and updated every sampling period Δt.

The friction value MU representing the friction coefficient $\mu$ of the road surface is determined in the following manner.

That is, the friction value MU is determined from the following table 2 according to the rate of change ΔVr of the vehicle speed obtained from the pseudo vehicle speed Vr as described above.

TABLE 2

| ΔVr | −0.3 G ≦ ΔVr | −1.2 G < −0.3 G | ΔVr ≦ −1.2 G |
| --- | --- | --- | --- |
| MU | 1 | 2 | 3 |

That is, in this embodiment, the friction value MU takes one of 1, 2 and 3 according to the value of the rate of change ΔVr of the vehicle speed. For example, when the rate of change ΔVr of the vehicle speed as converted to the gravitational acceleration is not smaller than −0.3G, that is, when the rate of change is small, the friction value MU is set to 1, which represents the low friction coefficient $\mu$ of the road surface. When the rate of change ΔVr of the vehicle speed is not larger than −1.2G, that is, when the rate of change is large, the friction value MU is set to 3, which represents the high friction coefficient $\mu$ of the road surface. When the rate of change ΔVr of the vehicle speed is between −0.3G and −1.2G, the friction value MU is set to 2.

The electronic control unit 24 calculates the slip ratios for the first to third channels on the basis of the rear wheel speed Wr, the wheel speeds W1 and W2 of the front wheels 1 and 2 and the pseudo vehicle speed Vr according to the following formula (1).

slip ratio=(wheel speed/pseudo vehicle speed)×100    (1)

Then the electronic control unit 24 determines various control threshold values for controlling the first to third channels.

Determination of the control threshold values will be briefly described, hereinbelow. For example, as for the first channel, the electronic control unit 24 selects the control threshold values corresponding to the friction value MU and the pseudo vehicle speed from various control threshold values set in advance according to the vehicle speed range and the friction coefficient $\mu$ of the road surface. The control threshold values include 0–2 deceleration threshold value B02 for determining shift from phase 0 representing the state where the antiskid control is not effect (will be referred to as "non-ABS state" hereinbelow) to phase 2 representing the state where the braking pressure is held constant after once increased (will be referred to as "pressure holding state after increase" hereinbelow), 1–2 deceleration threshold value B12 for determining shift from phase 1 representing the state where the braking pressure is increased (will be referred to as "pressure increasing state", hereinbelow) to the phase 2, 2–3 deceleration threshold value B23 for determining shift from the phase 2 to phase 3 representing state where the braking pressure is reduced (will be referred to as "pressure reducing state", hereinbelow), 3–5 deceleration threshold value B35 for determining shift from the phase 3 to phase 5 representing the state where the braking pressure is held constant after once lowered (will be referred to as "pressure holding state after lowering", hereinbelow), 5-1 slip ratio threshold value Bsz for determining shift from the phase 5 to phase 1, initial slip ratio threshold value B1 for a first cycle just after beginning of the control and like which are set according to the vehicle speed range and the friction coefficient $\mu$ of the road surface. The deceleration threshold values which greatly affect the braking force are set to be closer to 0G as the friction value MU becomes smaller (as the friction coefficient $\mu$ of the road surface become smaller) in order to cause the braking performance with a high friction coefficient $\mu$ of the road surface and the response to control with a low friction coefficient $\mu$ of the road surface to be compatible with each other.

The control threshold values for the second and third channels are set in the similar manner.

Further the electronic control unit 24 effects lockup determining processing for each of the first to third channels and phase determining processing for defining control variables for the first to third valve units 20, 21 and 23.

The lockup determining processing for the first channel will be briefly described by way of illustration.

In the lockup determining processing for the first channel, the electronic control unit 24 sets the present value of a continuation flag Fc for the first channel as the preceding value, and then determines whether the pseudo vehicle speed Vr and the wheel speed W1 satisfy predetermined conditions, e.g., Vr<5 km/h, W1<7.5 km/h. When it is determined that the pseudo vehicle speed Vr and the wheel speed W1 satisfy these conditions, the electronic control unit 24 resets the continuation flag Fc and a lockup flag F11 to 0, and otherwise the electronic control unit 24 determines whether the lockup flag F11 is 1. When it is determined that the lockup flag F11 is not 1, the electronic control unit 24 sets the lockup flag F11 to 1 when predetermined condition is satisfied, e.g., when the pseudo vehicle speed Vr is higher than the wheel speed W1.

When it is determined that the lockup flag F11 is 1, the electronic control unit 24 sets the phase number P1 for the first channel to 5 (that the phase number P1 for the first channel is 5 means that the control on the first channel is in the phase 5) and when the slip ratio S1 of the left front wheel is larger than 90%, the electronic control unit 24 sets the continuation flag Fc to 1.

The lockup determination for the second and third channels is effected in the similar manner.

The phase determining processing is a processing for selecting one of the phases 0 to 5 by comparison of the respective control threshold values set according to the operating condition of the vehicle and the wheel speed accelerations and/or the slip ratios of the respective wheels. The phase 0 represents the non-ABS state, the phase 1 represents the pressure increasing state during the antiskid control, the phase 2 represents the pressure holding state after increase, the phase 3 represent the pressure reducing state, the phase 4 represents the state where the braking pressure is quickly reduced (will be referred to as "quick pressure reducing state" hereinbelow), and the phase 5 represents the pressure holding state after lowering.

The electronic control unit 24 sets the control variable according to the phase number for each channel and outputs braking pressure control signals determined on the control variables for the respective channels to the first to third valve units 20, 21 and 23. Thus the braking pressures in the branch lines 19a and 19b for the left and right front brakes 11 and 12 and in the branch lines 22a and 22b for the left and right rear brake 13 and 14 are increased, reduced or held at the level after increase or reduction.

Figure 2:
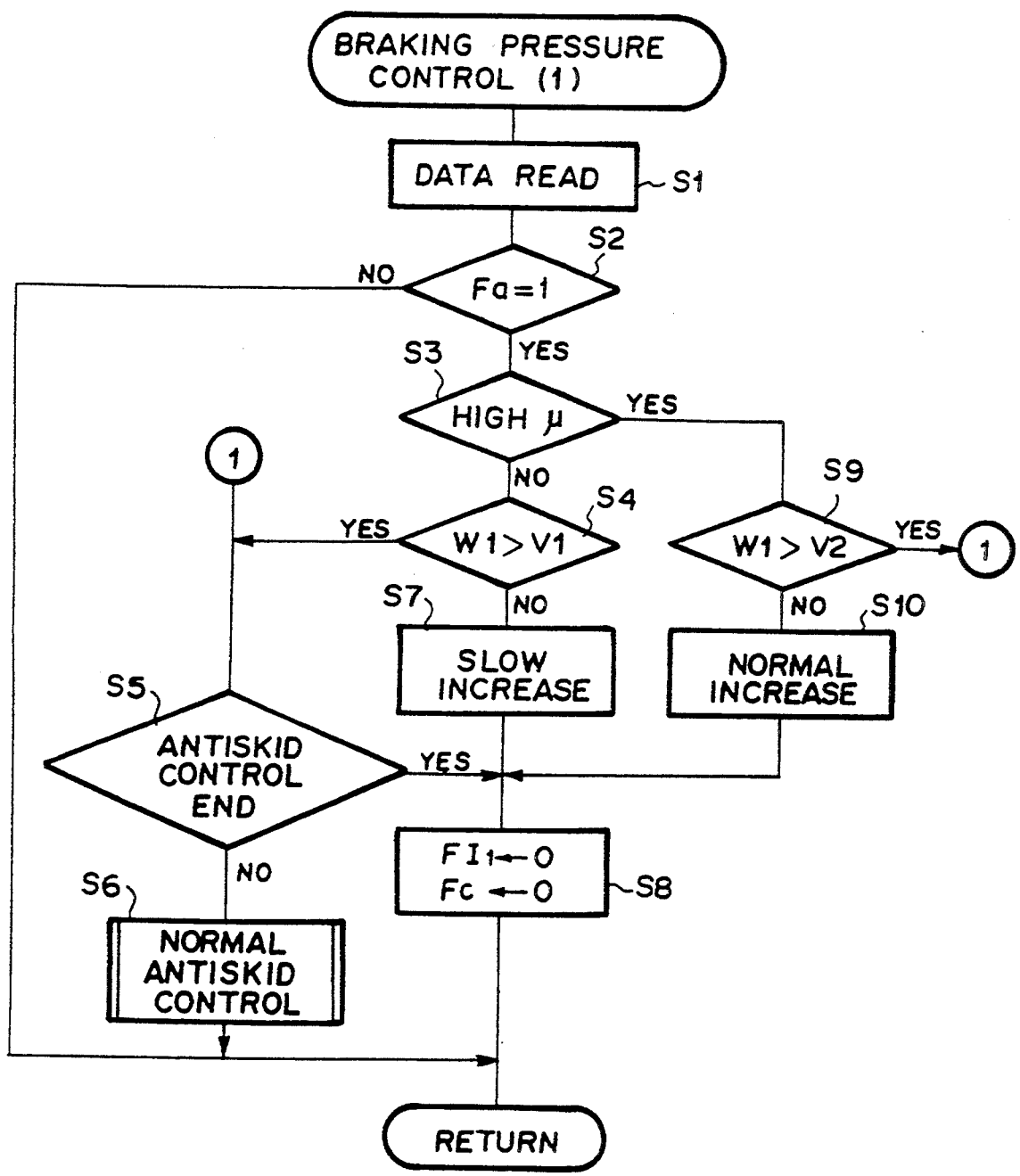
FIG. 2 is a flow chart for illustrating the braking pressure control in accordance with a first embodiment of the present invention.

The control of the braking pressure in a first embodiment of the present invention will be described on the first channel with reference to the flow chart shown in FIG. 2 by way of example.

The electronic control unit 24 first reads various data in step S1 and then determines whether antiskid control flag Af is 1, that is, whether the antiskid control is being effected in step S2. The antiskid control flag Af is set to 1 when at least one of lockup flags F11, F12 and F13 for the first to third channels is set to 1, and is reset to 0, for instance, when the brake switch 25 is turned off.

When it is determined in step S2 that the antiskid control flag Af is 1, the electronic control unit 24 determines in step S3 whether the friction coefficient $\mu$ of the road surface is high, that is, in this particular embodiment, whether the friction value MU is 3.

When it is determined that the friction value MU is not 3 but 1 or 2, the electronic control unit 24 determines in step S4 whether the wheel speed W1 of the left front wheel 1 is higher than a first preset value V1 (e.g., 3.5 km/h). When it is determined that the former is higher than the latter, the electronic control unit 24 determines in step S5 whether the antiskid control has been terminated. When it is determined that the antiskid control has not been terminated, the electronic control unit 24 performs the normal antiskid control according to a predetermined sub routine. (step S6)

When it is determined in step S4 that the wheel speed W1 of the left front wheel 1 is not higher than the first preset value V1, the electronic control unit 24 sets a predetermined slow pressure increase control variable in step S7 and resets the lockup flag F11 and the continuation flag Fc to 0 in step S8.

When it is determined in step S3 that the friction coefficient $\mu$ of the road surface is high, the electronic control unit 24 determines in step S9 whether the wheel speed W1 is higher than a second preset value V2 (e.g., 5 km/h) which is higher than the first preset value V1. When it is determined that the former is higher than the latter, the electronic control unit 24 determines in step S5 whether the antiskid control has been terminated. When it is determined that the antiskid control has not been terminated, the electronic control unit 24 performs the normal antiskid control according to a predetermined sub routine. (step S6)

When it is determined in step S9 that the wheel speed W1 is not higher than the second preset value V2, the electronic control unit 24 sets a predetermined normal pressure increase control variable in step S10 and resets the lockup flag F11 and the continuation flag Fc to 0 in step S8.

The operation of the first embodiment will be described based on the antiskid control of the first channel by way of example, hereinbelow.

Figure 3:
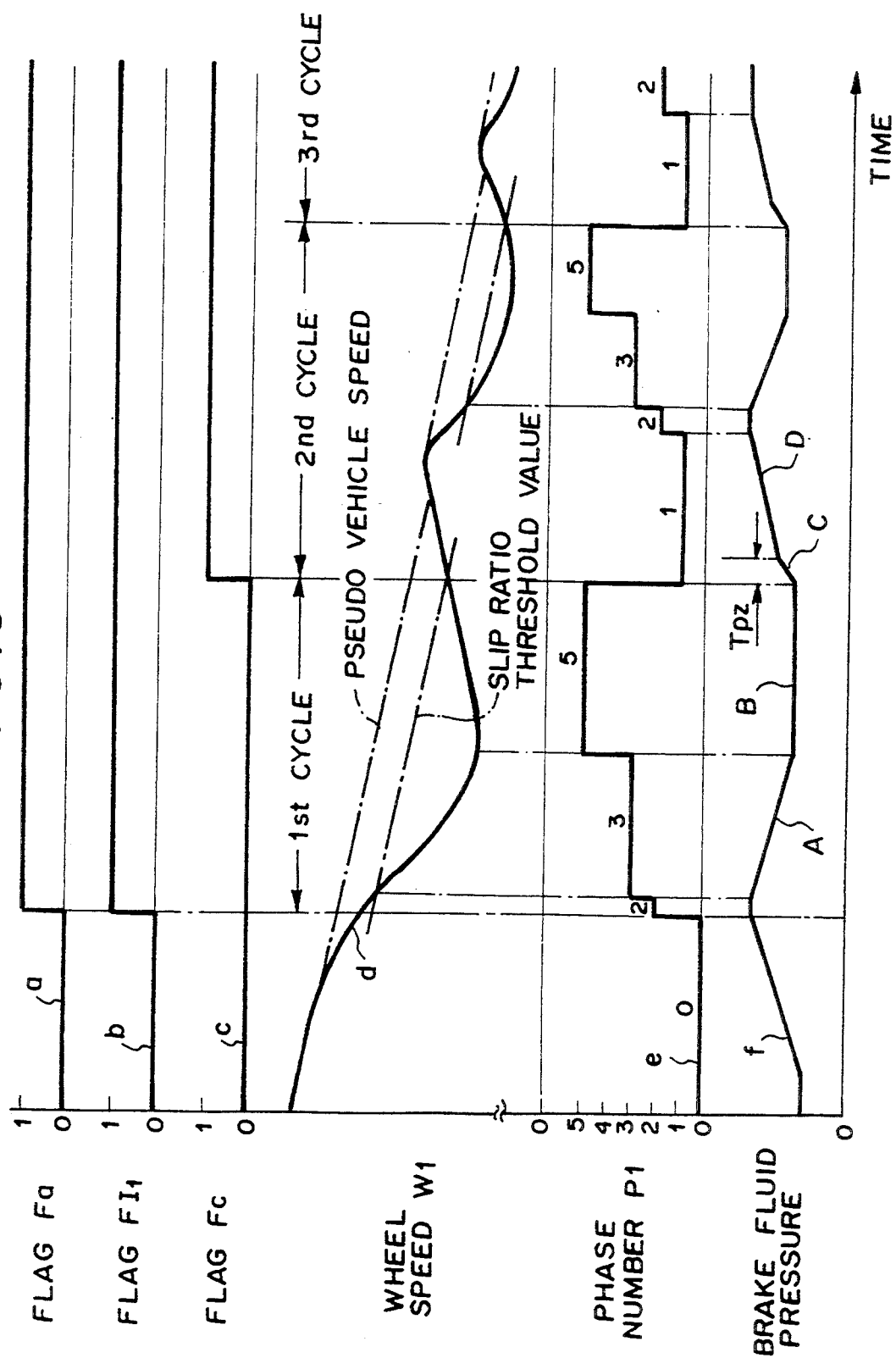
FIG. 3 is a time chart showing the state before and after initiation of the antiskid control.

When the braking pressure generated by the master cylinder 18 in response to depression of the brake pedal 16 in the non-ABS state during deceleration gradually increases and the rate of change of the wheel speed W1, or the deceleration DW1 of the wheel speed W1, reaches $-3G$ as shown by line d in FIG. 3, the lockup flag F11 is set to 1 and the antiskid control flag Af is set to 1, whereby the antiskid control is initiated.

Then the electronic control unit 24 compares the slip ratio S1, the deceleration DW1 and the acceleration AW1 calculated on the basis of the wheel speed W1 with the control threshold values described above. Assuming that the initial slip ratio threshold value B1 is set to 90%, the electronic control unit 24 changes the phase number P1 from 0 to 2 as shown by line e when the slip ratio S1 is, for instance, 96%. Accordingly, the braking pressure is held at the level to which it increased by that time as shown by line f. When the slip ratio S1 falls below 90%, the electronic control unit 24 changes the phase number P1 from 2 to 3 as shown by line d and the relief valve 20b of the first valve unit 20 is turned on and off according to a predetermined duty ratio, whereby the braking pressure is gradually reduced at a predetermined rate as shown by line f (portion A) and the rotating force of the front wheel 1 begins to recover.

As the braking pressure is further reduced and the deceleration DW1 and the acceleration AW1 are nullified, the electronic control unit 24 changes the phase number P1 from 3 to 5, whereby the braking pressure is held at the level to which it decreased by that time as shown by line f (portion B).

When the slip ratio S1 exceeds 90% while the phase of the antiskid control is held in the phase 5, the electronic control unit 24 sets the continuation flag Fc to 1 as shown by line c, whereby the antiskid control for the first channel is shifted to a second cycle from a first cycle just after the initiation of the antiskid control. In this case, the electronic control unit 24 changes the phase number P1 to 1.

Just after shift to the phase 1, the on-off valve 20a of the first valve unit 20 is opened and closed at 100% duty ratio according to an initial quick pressure increase time Tpz which is set on the basis of the duration of the phase 5 in the first cycle, whereby the braking pressure is increased at a high rate as shown by line f (portion C). After the initial quick pressure increase time Tpz, the on-off valve 20a is opened and closed at a predetermined duty ratio so that the braking pressure is gradually increased at a rate lower than said high rate as shown by line f (portion D).

The electronic control unit 24 sets the phase number P1 to 1 and shift to a third cycle when it determines, for instance, that the slip ratio S1 is larger than the 5-1 slip ratio threshold value Bsz.

Figure 4:
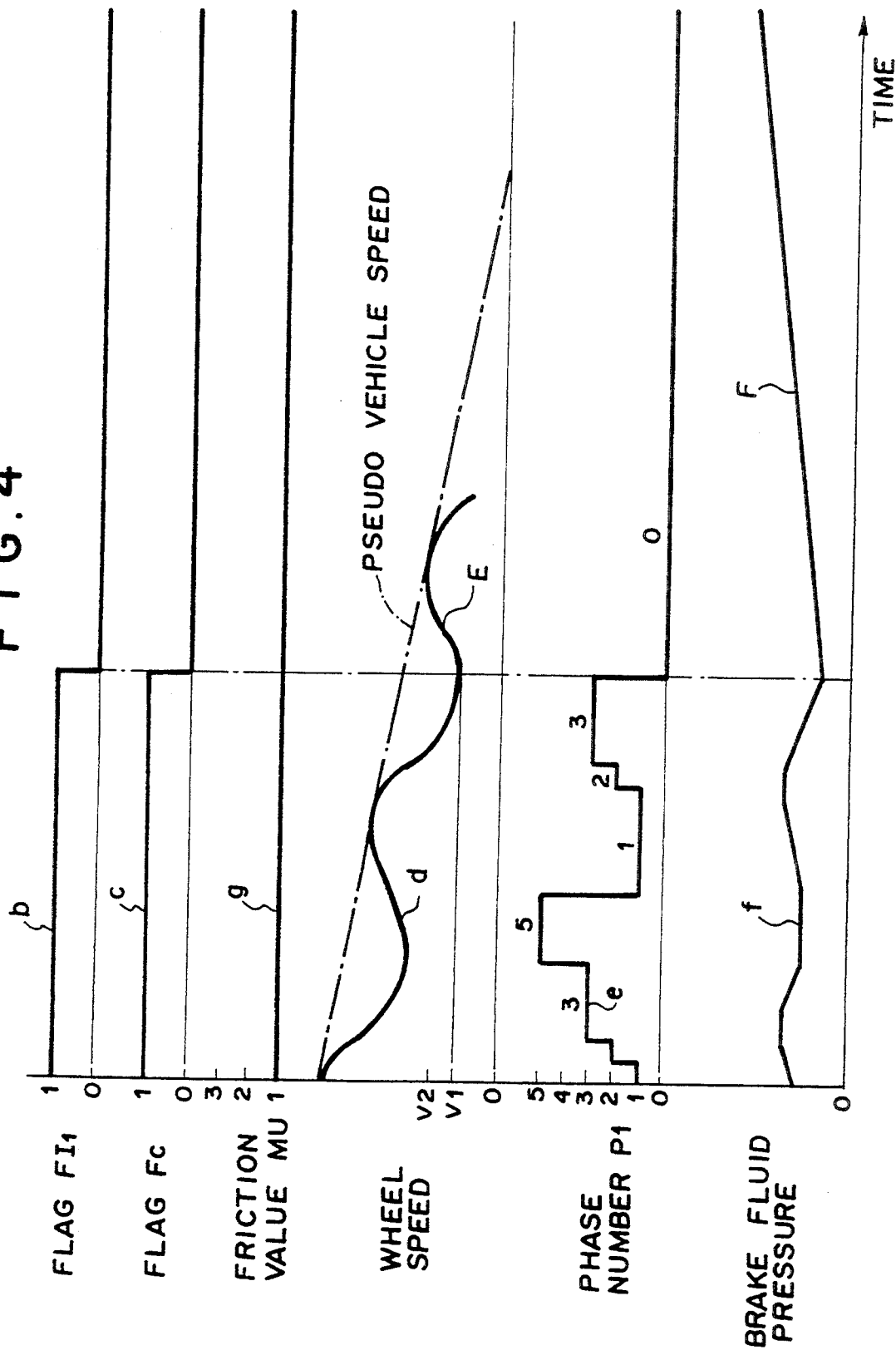
FIG. 4 is a time chart showing the state before and after termination of the antiskid control on a low $\mu$ road surface.

When the wheel speed W1 falls to the first preset value V1 as shown by line d in FIG. 4 (portion E) in the state where the friction value MU is 1, which indicates that the friction coefficient $\mu$ of the road surface is low, the electronic control unit 24 resets the lockup flag F11 and the continuation flag Fc for the channel to 0 and then shifts to the termination processing.

Since the friction value MU is 1, the electronic control unit 24 sets the slow pressure increase control variable and outputs a braking pressure control signal according to the slow pressure increase control variable to the first valve unit 20, whereby the braking pressure is gradually increased as shown by line f in FIG. 4 (portion F) and lockup of the left front wheel 1 is prevented.

Since the similar braking pressure control is effected also for the second and third channels just before the vehicle stopping, lockup or skid of all the wheels 1 to 4 is prevented and the vehicle can be stably stopped even on the low $\mu$ road surface such as frozen road.

Figure 5:
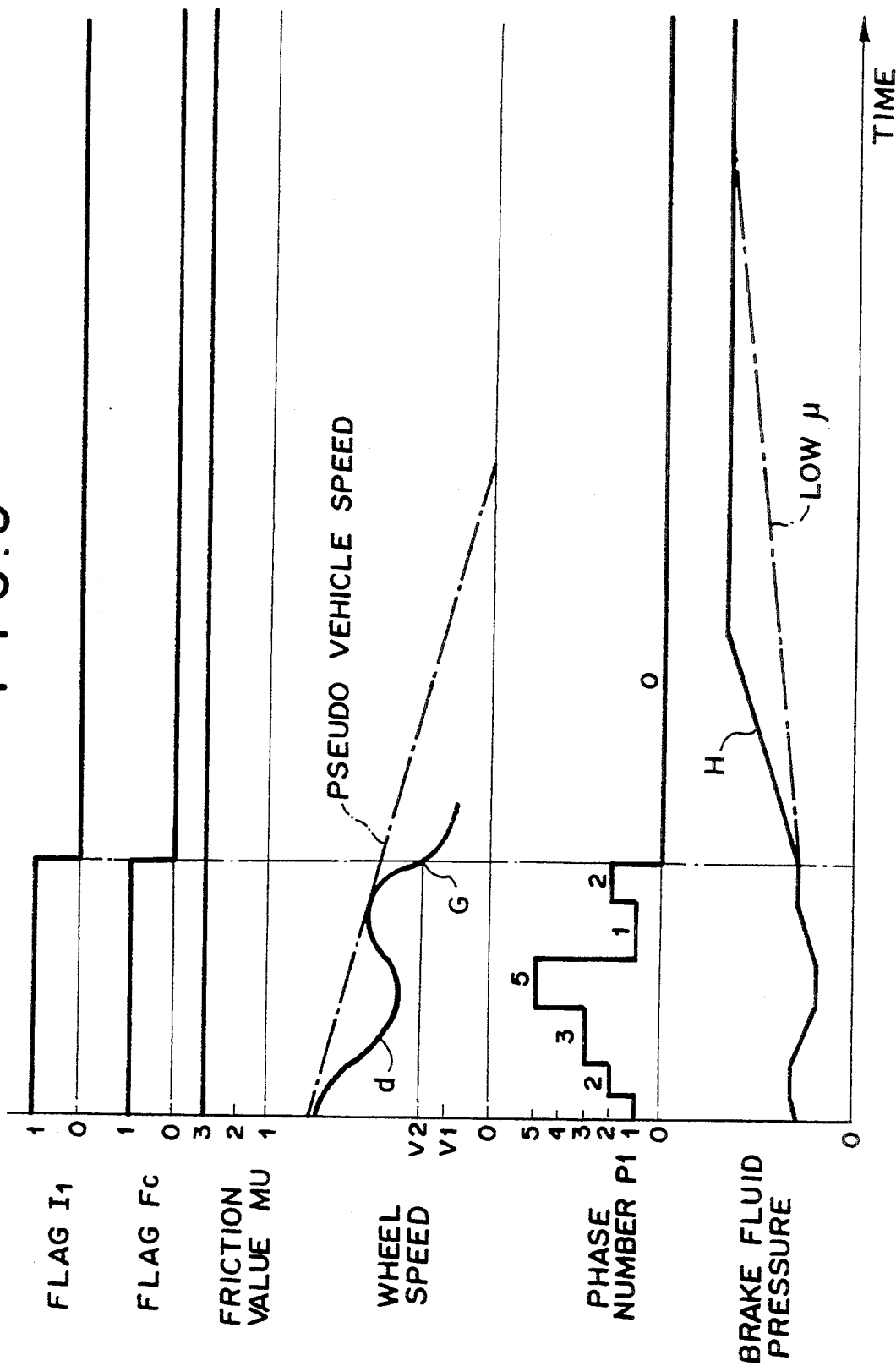
FIG. 5 is a time chart showing the state before and after termination of the antiskid control on a high $\mu$ road surface.

In the state where the friction value MU is 3, which indicates that the friction coefficient $\mu$ of the road surface is high, the electronic control unit 24 resets the lockup flag F11 and the continuation flag Fc for the first channel to 0 as shown by lines b and c in FIG. 5 when the wheel speed W1 falls to the second preset value V2 as shown by the line d in FIG. 5 (portion G), and then shifts to the termination processing. With this arrangement, the probability that the braking pressure is unexpectedly reduced is lowered and the stopping distance comes to better conform to that expected by the driver as compared with when the antiskid control is continued until the wheel speed W1 falls to the first preset value V1. At the same time, since being surely gripping the road surface, the left front wheel 1 cannot lock or skid to lose running stability.

The electronic control unit 24 sets the normal pressure increase control variable when the wheel speed W1 falls to the second preset value V2, and outputs a braking pressure control signal according to the normal pressure increase control variable to the first valve unit 20, whereby the braking pressure is increased more quickly than on the low $\mu$ road surface as shown by line f in FIG. 5 (portion H) and the vehicle is surely stopped.

Figure 6:
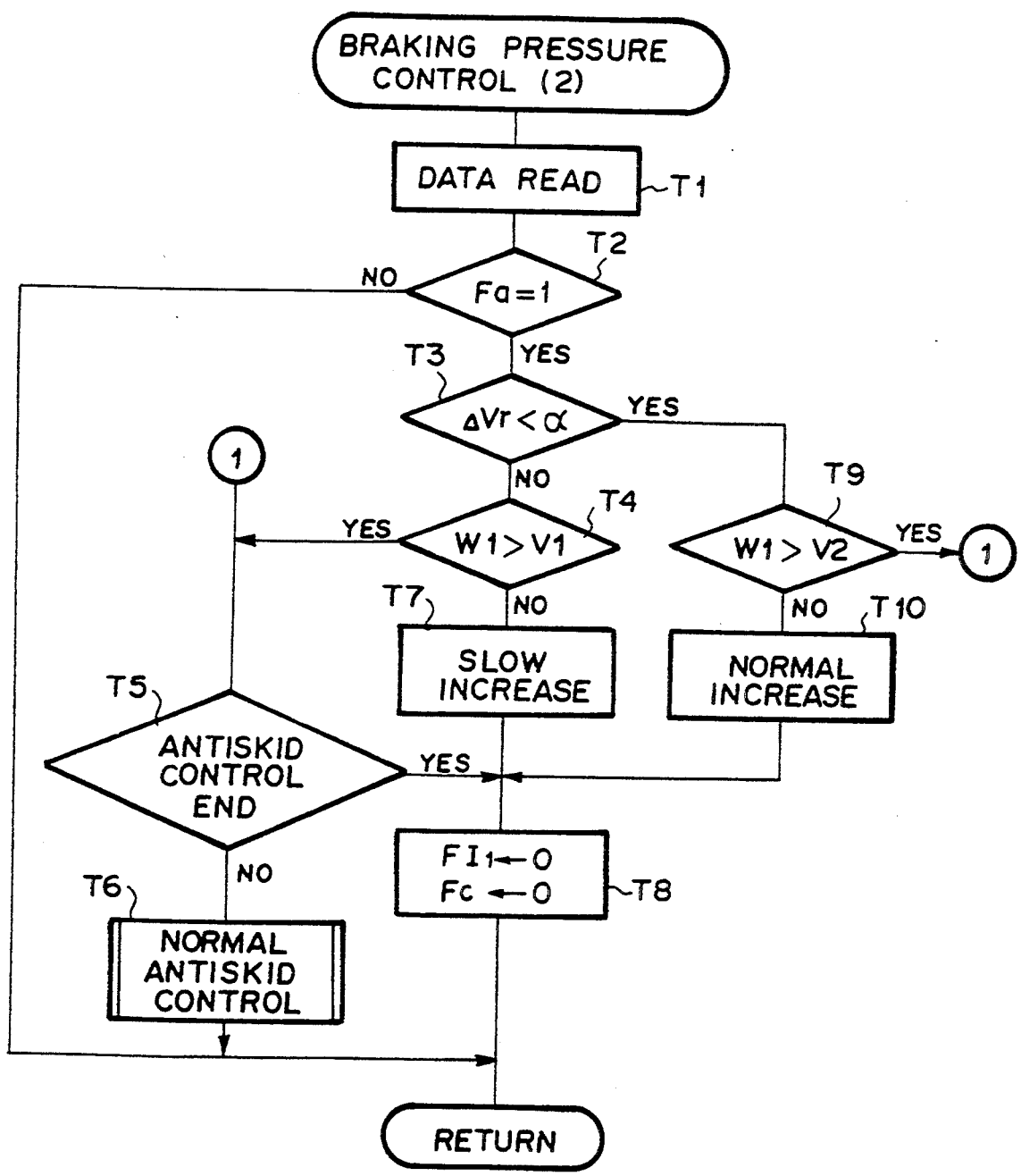
FIG. 6 is a flow chart for illustrating the braking pressure control in accordance with a second embodiment of the present invention.

The control of the braking pressure in a second embodiment of the present invention will be described on the first channel with reference to the flow chart shown in FIG. 6 by way of example.

The electronic control unit 24 first reads various data in step T1 and then determines whether antiskid control flag Af is 1 in step T2. When it is determined in step T2 that the antiskid control flag Af is 1, the electronic control unit 24 determines in step T3 whether the rate of change $\Delta Vr$ of the vehicle speed is smaller than a predetermined value $\alpha$ (e.g., $-0.8G$ as a value converted to the gravitational acceleration), that is, whether the change of the pseudo vehicle speed Vr in the direction of deceleration is larger than the predetermined value $\alpha$.

When it is determined that the rate of change $\Delta Vr$ of the vehicle speed is not smaller than the predetermined value $\alpha$, that is, when the deceleration of the pseudo vehicle speed Vr is small, the electronic control unit 24 determines in step T4 whether the wheel speed W1 of the left front wheel 1 is higher than a first preset value V1. When it is determined that the former is higher than the latter, the electronic control unit 24 determines in step T5 whether the antiskid control has been terminated. When it is determined that the antiskid control has not been terminated, the electronic control unit 24 performs the normal antiskid control according to a predetermined sub routine. (step T6)

When it is determined in step T4 that the wheel speed W1 of the left front wheel 1 is not higher than the first preset value V1, the electronic control unit 24 sets a predetermined slow pressure increase control variable in step T7 and resets the lockup flag F11 and the continuation flag Fc to 0 in step T8.

When it is determined in step T3 that the rate of change $\Delta Vr$ of the vehicle speed is smaller than the predetermined value $\alpha$, that is, when the deceleration of the pseudo vehicle speed Vr is large, the electronic control unit 24 determines in step T9 whether the wheel speed W1 is higher than a second preset value V2 which is higher than the first preset value V1. When it is determined that the former is higher than the latter, the electronic control unit 24 determines in step T5 whether the antiskid control has been terminated. When it is determined that the antiskid control has not been terminated, the electronic control unit 24 performs the normal antiskid control according to a predetermined sub routine. (step T6)

When it is determined in step T9 that the wheel speed W1 is not higher than the second preset value V2, the electronic control unit 24 sets a predetermined normal pressure increase control variable in step T10 and resets the lockup flag F11 and the continuation flag Fc to 0 in step T8.

The operation of the second embodiment will be described based on the antiskid control of the first channel by way of example, hereinbelow.

Figure 7:
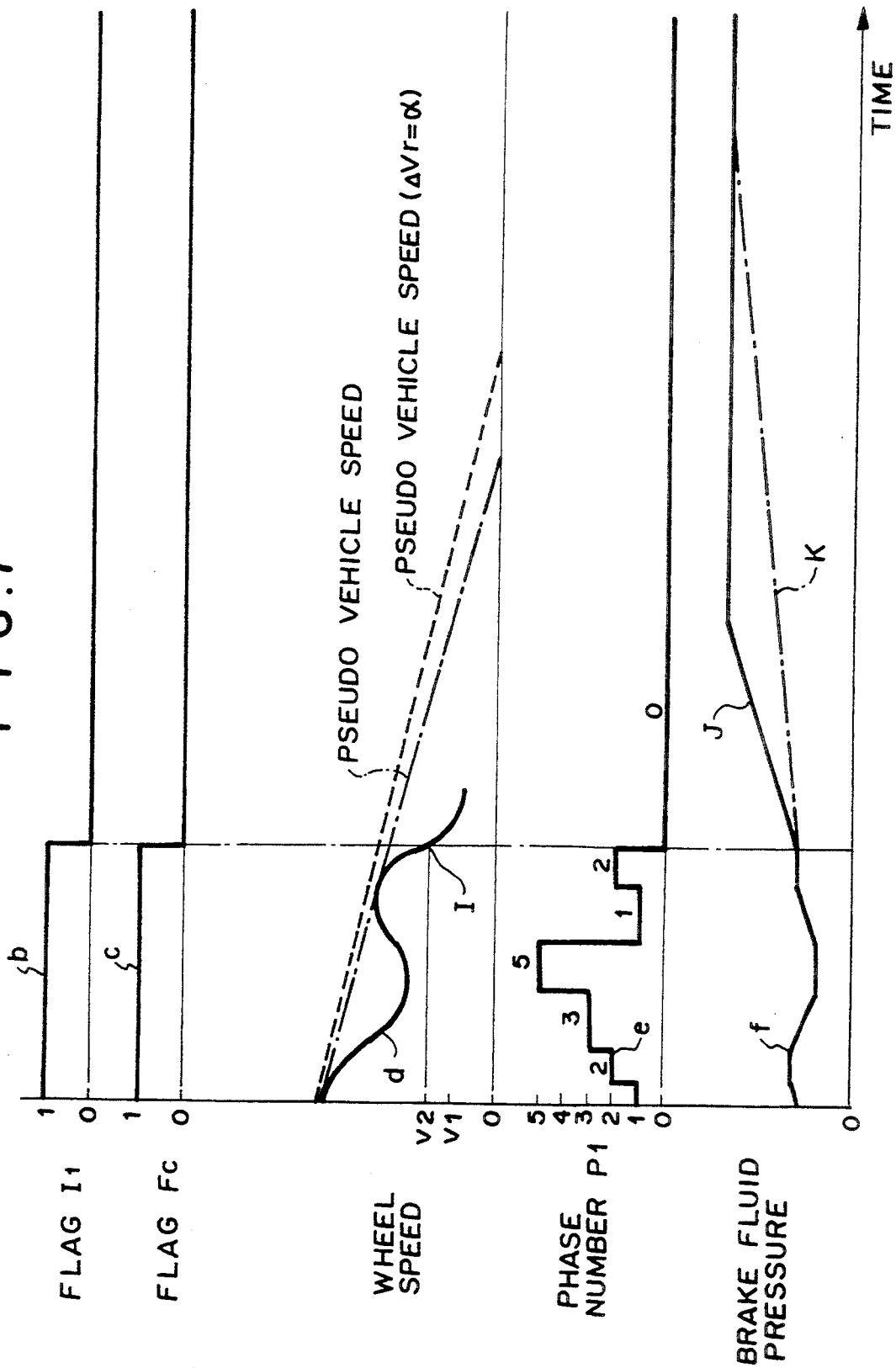
FIG. 7 is a time chart showing the state before and after termination of the antiskid control on a high $\mu$ road surface in the second embodiment.

When the pseudo vehicle speed Vr falls at a rate higher than the predetermined value $\alpha$ as shown by the chained line in FIG. 7, the electronic control unit 24 resets the lockup flag F11 and the continuation flag Fc for the first channel to 0 at the time (indicated at I) the wheel speed W1 falls to the second preset value V2 as shown by line b and c and then shifts to the termination processing. Accordingly as in the first embodiment, the probability that the braking pressure is unexpectedly reduced is lowered and the stopping distance comes to better conform to that expected by the driver as compared with when the antiskid control is continued until the wheel speed W1 falls to the first preset value V1. At the same time, since being surely gripping the road surface, the left front wheel 1 cannot lock or skid to lose running stability.

Further since the electronic control unit 24 sets the normal pressure increase control variable when the wheel speed W1 falls to the second preset value V2 and outputs a braking pressure control signal according to the normal pressure increase control variable to the first valve unit 20, the braking pressure is increased quickly as shown by line f in FIG. 7 (portion J) and the vehicle is surely stopped.

On the other hand, when the pseudo vehicle speed Vr falls at a rate of the predetermined value $\alpha$ as shown by the broken line in FIG. 7, the electronic control unit 24 resets the lockup flag F11 and the continuation flag Fc for the first channel to 0 at the time the wheel speed W1 falls to the first preset value V1 and then shifts to the termination processing.

In this case, the braking pressure is slowly increased as indicated at K and lockup or skid of the left front wheel 1 is prevented.

What is claimed is;

1. An antiskid brake system for a vehicle comprising a wheel speed detecting means for detecting wheel speed of a wheel of the vehicle, a braking pressure control means for controlling the braking pressure applied to the wheel, an antiskid control means for effecting an antiskid control causing the braking pressure control means to periodically increase and reduce the braking pressure applied to the wheel on the basis of the wheel speed of the wheel, an antiskid control termination determining means for comparing the wheel speed detected by the wheel speed detecting means with a reference value for determining that the antiskid control has been terminated when the wheel speed is lower than the reference value, a road surface condition detecting means for detecting the condition of a road surface on which the vehicle is running and a reference value changing means for lowering the reference value when the condition of the road surface detected by the road surface condition detecting means is more apt to cause the wheel to skid and operating said antiskid control means in response to the lower reference value for preventing the wheels of the vehicle from skidding on such road surface.

2. An antiskid brake system as defined in claim 1 in which said road surface condition detecting means detects a friction coefficient of the road surface on the basis of the wheel speed, and the reference value changing means makes lower the reference value as the friction coefficient of the road surface becomes smaller.

3. An antiskid brake system as defined in claim 2 further comprising a braking pressure increasing means which causes the braking pressure control means to increase the braking pressure, after said antiskid control termination determining means determines that the antiskid control has been terminated, at a rate which is reduced as the friction coefficient of the road surface detected by the road surface condition detecting means becomes lower.

4. An antiskid brake system as defined in claim 1 in which said road surface condition detecting means estimates a pseudo vehicle speed on a basis of a wheel speed and calculates a rate of change of a pseudo vehicle speed per unit time, and said reference value changing means makes lower the reference value as the rate of change of the pseudo vehicle speed per unit time becomes smaller.

5. An antiskid brake system as defined in claim 4 further comprising a braking pressure increasing means for causing the braking pressure control means to increase the braking pressure, after said antiskid control termination determining means determines that the antiskid control has been terminated, at a rate which is reduced as the rate of change of the pseudo vehicle speed per unit time detected by the road surface condition detecting means becomes smaller.

6. An antiskid brake system for a vehicle comprising a wheel speed sensor for detecting wheel speed of a wheel of the vehicle, a valve unit for controlling the braking pressure applied to the wheel, and an electronic control unit for effecting an antiskid control causing the valve unit to periodically increase and reduce the braking pressure applied to the wheel on the basis of the wheel speed of the wheel by comparing the wheel speed detected by the wheel speed sensor with a reference value and determining that the antiskid control has been terminated when the wheel speed is lower than the reference value, wherein said electronic control unit detects a condition of the road surface on which the vehicle is running and sets the reference value lower when a condition of the road surface is more apt to cause the wheel to skid and operates said valve unit in response to the lower reference value for preventing the wheels of the vehicle from skidding on such road surface.

* * * * *